(12) United States Patent
Faist (10) Patent No.: US 9,336,181 B2
(45) Date of Patent: *May 10, 2016

(54) RETRIEVAL OF MEASURED VALUES, DIAGNOSTIC INFORMATION OR DEVICE PARAMETERS

(71) Applicant: VEGA Grieshaber KG, Wolfach (DE)

(72) Inventor: Fridolin Faist, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 623 days.

This patent is subject to a terminal disclaimer.

(21) Appl. No.: 13/736,670

(22) Filed: Jan. 8, 2013

(65) Prior Publication Data

US 2013/0185004 A1 Jul. 18, 2013

Related U.S. Application Data

(60) Provisional application No. 61/587,862, filed on Jan. 18, 2012.

(30) Foreign Application Priority Data

Jan. 18, 2012 (EP) .................................... 12151586

(51) Int. Cl.
*G06F 17/00* (2006.01)
*G05B 19/042* (2006.01)
*G01F 25/00* (2006.01)

(52) U.S. Cl.
CPC ............ *G06F 17/00* (2013.01); *G01F 25/0007* (2013.01); *G01F 25/0061* (2013.01); *G05B 19/0423* (2013.01); *G05B 2219/25206* (2013.01); *G05B 2219/31121* (2013.01); *G05B 2219/31132* (2013.01); *G05B 2219/32144* (2013.01)

(58) Field of Classification Search
USPC ............................................................ 702/45
See application file for complete search history.

(56) References Cited

U.S. PATENT DOCUMENTS

| | | | |
|---|---|---|---|
| 2006/0168396 A1* | 7/2006 | LaMothe | G05B 23/0221 711/113 |
| 2009/0292996 A1 | 11/2009 | Anne et al. | |
| 2013/0275572 A1* | 10/2013 | Schaetzle | H04L 41/08 709/223 |

FOREIGN PATENT DOCUMENTS

| | | |
|---|---|---|
| DE | 10 2008 038 417 | 2/2010 |
| DE | 10 2010 027 963 | 10/2011 |

* cited by examiner

*Primary Examiner* — Tung S Lau
(74) *Attorney, Agent, or Firm* — Fay Kaplun & Marcin, LLP (57) ABSTRACT

A system, a device and a method are for retrieval of measured values, items of diagnostic information or device parameters in level measurement, pressure measurement, flow measurement or limit detection. Provided in the measuring device is a flag which is raised when the measuring device changes a measuring device parameter, for example. An external control device receives this flag and, using said flag, can determine whether a device parameter has been changed in the measuring device. If this is the case, it requests the group of device parameters, associated with this device parameter, from the measuring device. In this manner, the transfer of data can be reduced.

7 Claims, 8 Drawing Sheets

RETRIEVAL OF MEASURED VALUES, DIAGNOSTIC INFORMATION OR DEVICE PARAMETERS

REFERENCE TO RELATED APPLICATIONS

This application claims the benefit of the filing date of EP Patent Application Serial No. EP 12 151 586.0 filed 18 Jan. 2012 and U.S. Provisional Patent Application Ser. No. 61/587,862 filed 18 Jan. 2012, the disclosure of both applications is hereby incorporated by reference.

FIELD OF THE INVENTION

The invention relates to the exchange of data within a level measuring system, a pressure measuring system, a limit detection measuring system or a flow measuring system. In particular, the invention relates to a level measuring system, a pressure measuring system, a limit detection measuring system, a flow measuring system, a method for loading device parameters, measured values and items of diagnostic information into a user interface of a control unit of a level measuring device, a pressure measuring device, a limit detection device or a flow measuring device, to program elements and to a computer-readable medium.

TECHNICAL BACKGROUND

Field devices are often put into operation and maintained in a computer-assisted manner. For example, a connection to a laptop or PC is produced either directly, for example by a USB interface or via a communications adapter, in order to carry out parameterisations and/or diagnostics via this connection by means of an interface at the field device which can be a level measuring device, a limit detection device, a pressure measuring device or a flow measuring device.

In the following, a laptop or PC of this type will also be called a control unit or an operator device. This is quite generally an arithmetic-logic unit which can communicate with the field device via an appropriate data connection in order to carry out a parameterisation or to read out diagnostic data or measured data in the field device.

In many cases, there is a considerable amount of data to be exchanged between the control unit and the field device.

SUMMARY OF THE INVENTION

A level measuring system, a limit detection measuring system, a pressure measuring system, a flow measuring system, program elements, a computer-readable medium and a method according to the features of the coordinated claims are provided.

It is pointed out here that features which are mentioned in the following in respect of the level measuring system can also be implemented in the pressure measuring system, the flow measuring system, the limit detection measuring system and as a step in the method and as instructions in the program elements and in the computer-readable medium, and vice versa.

In particular, the method can also be implemented to load device parameters, measured values and/or items of diagnostic information into a user interface of a control unit of a pressure measuring device, limit detection measuring device or of flow measuring device.

According to a first aspect of the invention, a level measuring system is provided which has one or more level measuring devices and one or more control units.

Furthermore, a communication interface for connecting one of the control units to a least one of the level measuring devices is provided.

The level measuring device is configured to determine whether a current measured value, i.e., a "first value", which has been recorded by the level measuring device in a measurement, differs from a measured value, i.e., a "second value", recorded in a measurement preceding this measurement. Alternatively or in addition, the level measuring device is configured to determine whether a current item of diagnostic information, i.e., a "first item of diagnostic information", generated by the level measuring device, differs from an item of diagnostic information, i.e., a "second item of diagnostic information", preceding this item of diagnostic information. Alternatively or in addition, the level measuring device is configured to determine whether a current device parameter has changed due to another device parameter changing (inside the level measuring device). This determination can be carried out, for example, using the comparison of the changed ("other") device parameter with a list which is stored in the level measuring device and comprises the device parameters on which other device parameters depend.

The control unit is configured to retrieve the current measured value, the current diagnostic information and/or the current device parameter from the level measuring device only when the level measuring device has established a difference between the measured values or between the items of diagnostic information or has established that the device parameter has changed.

Thus, for example, if the control unit changes a device parameter in the level measuring device, the level measuring device checks whether subsequently another, current device parameter is (automatically) changed, since it is dependent on the device parameter which has been changed by the control unit. If this is the case, then the control unit retrieves the changed (because dependent) device parameter from the level measuring device. In addition to the retrieval of the changed (dependent) device parameter, an entire group of parameters or for the entire parameter set may be retrieved.

It is a similar situation for the items of diagnostic information and the measured values.

Here, as well, it may be possible that when diagnostic data or a measured value have been changed accordingly, these changed data/measured values, or data (sub)groups or an entire data record is/are exclusively retrieved by the control unit.

According to a further aspect of the invention, the level measuring device only performs the determination when a new measured value has been recorded and/or when a new item of diagnostic information has been generated and/or when the control unit has initiated (i.e. triggered) the change of a device parameter by writing the device parameter into a memory of the level measuring device.

According to a further aspect of the invention, the control unit transmits the changed device parameter to the level measuring device before the level measuring device makes the determination.

In other words, the control unit triggers the change of the device parameter in the level measuring device. Thereupon, the level measuring device determines whether a further ("current") device parameter has also changed because of this.

According to a further aspect of the invention, when the level measuring device determines that the current measured value, the current item of diagnostic information and/or the current device parameter have changed, it records this fact in what is known as a flag, i.e., a marker. Said flag or marker can be a bit or a bit sequence which can be monitored. The control unit retrieves the flag and checks it. Thereupon, it can then decide whether or not the current measured value, the current item of diagnostic information or the current device parameter is to be retrieved from the level measuring device or not.

According to a further aspect of the invention, the determination whether (or not) the current device parameter has changed due to another device parameter changing takes place by identifying the other device parameter in a list provided for this purpose.

According to a further aspect of the invention, the control unit retrieves a complete set of device parameters from the level measuring device when the level measuring device has determined that the current device parameter has changed.

According to a further aspect of the invention, the control unit checks whether the level measuring device has already made the determination.

According to a further aspect of the invention, the level measuring device automatically informs the control unit when it has made the determination.

For example, this may take place by transmitting the corresponding flag to the control unit which then compares the flag with the corresponding earlier flag stored in the control unit, to determine whether or not changes have been made.

According to a further aspect of the invention, a method is provided for loading device parameters, measured values and/or items of diagnostic information into a user interface of a control unit of a level measuring device, a pressure measuring device, a flow measuring device and/or a limit detection measuring device. First of all, the measuring device determines whether a current measured value, recorded by the measuring device in a measurement, differs from a measured value recorded in a measurement preceding this measurement, whether a current item of diagnostic information, generated by the level measuring device, differs from an item of diagnostic information preceding this item of diagnostic information and/or whether a current device parameter has changed due to another device parameter changing. Thereupon, the current measured value, the current item of diagnostic information and/or the current device parameter is/are retrieved from the measuring device, more specifically by the control unit. This retrieval is only performed when the measuring device has established a difference between the measured values or between the items of diagnostic information and/or when the measuring device has established that the device parameter has changed.

According to a further aspect of the invention, program elements are provided which, when performed on processors in a level measuring system, a pressure measuring system, a limit detection measuring system and/or a flow measuring system, trigger a corresponding measuring device of the measuring system to carry out one or more of the following steps: to determine whether a current measured value, recorded by the measuring device in a measurement, differs from a measured value recorded in the measurement preceding this measurement; to determine whether a current item of diagnostic information, generated by the level measuring device, differs from an item of diagnostic information preceding this item of diagnostic information; to determine whether a current device parameter has changed due to another device parameter changing.

Furthermore, the program elements trigger a control unit of the measuring system to retrieve the current measured value, the current item of diagnostic information and/or the current device parameter from the measuring device only when the measuring device has established a difference between the measured values or between the items of diagnostic information and/or when the measuring device has established that the device parameter has changed.

According to a further aspect of the invention, a computer-readable medium is provided on which the program elements which have been described above and will be described in the following are stored.

In other words, the program elements can trigger the measuring devices and the control units of the corresponding measuring systems to carry out the method steps described above and in the following.

According to a further aspect of the invention, a limit detection system is provided which comprises a limit detection device and a control unit.

According to a further aspect of the invention, a flow measuring system is provided which comprises a flow measuring device and a control unit.

According to a further aspect of the invention, a pressure measuring system is provided which comprises a pressure measuring device and a control unit.

In this respect, the measuring devices of the above-mentioned systems can carry out the "measuring device steps" described above and the control unit can carry out the "control unit steps" described above and below.

In this respect, the program elements can be, for example, parts of a software which are stored on processors of the corresponding measuring device and of the control unit. The processors can also be a subject-matter of the invention. Furthermore, this aspect of the invention comprises program elements which use the invention from the start as well as program elements which cause an existing program to use the invention by an update.

In the following, embodiments of the invention will be described with reference to the figures.

DETAILED DESCRIPTION OF EMBODIMENTS

The figures have been drawn schematically and are not to scale.

In the following description of the figures, if identical reference signs are used in different figures, they denote identical or similar elements. However, identical or similar elements can also be denoted by different reference signs.

Figure 1:
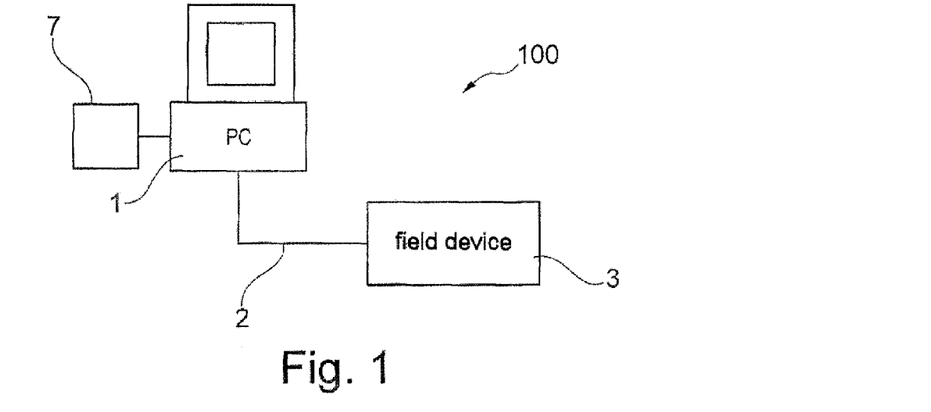
FIG. 1 shows a measuring system according to a first embodiment of the invention.

FIG. 1 (like FIGS. 2 and 4) shows a measuring system, for example a level, pressure or flow measuring system or a limit detection system according to embodiments of the invention.

In process automation, intelligent devices having interfaces for digital communication can be used. These devices are connected to a standard PC via these interfaces and can thus be operated via graphic user interfaces. It may be particularly advantageous for operation if the operating processes take place with an optimum performance. In order for this to happen, a method is required which only exchanges the most necessary device parameters between user interface and devices. Furthermore, care must also be taken that no unnecessary data appear on the bus systems, by which the different devices are interconnected.

The invention relates to methods and devices for optimising the volume of communication between measuring devices and user interface.

Figure 3A:
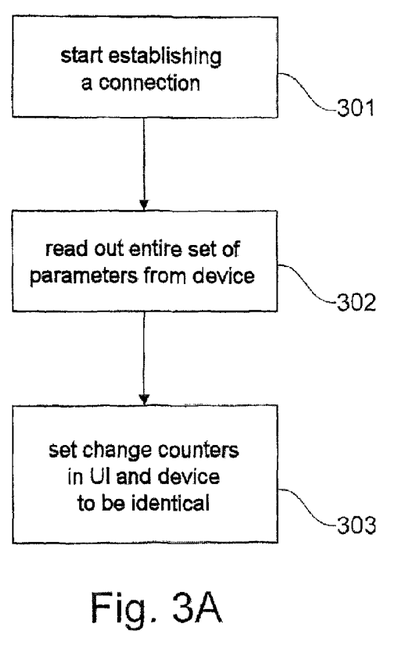
FIG. 3A shows a flow chart of a method for reading a set of parameters from a measuring device.
Figure 3B:
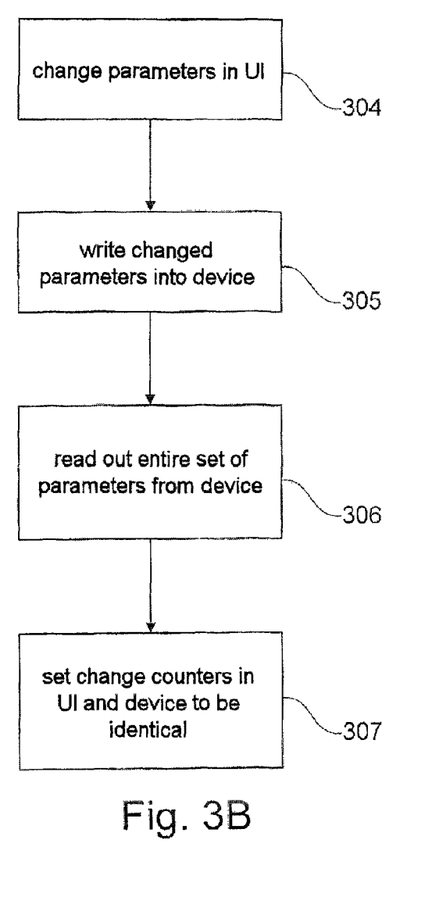
FIG. 3B shows a flow chart of a method for changing a set of parameters.

To allow the user to be able to operate fluidly on the user interface, when the first connection is established, typically all the device parameters which are relevant to the user interface are fully loaded, as is shown, for example in FIGS. 3A and 3B.

Measuring systems of this type comprise an operating tool 1, for example in the form of a personal computer, and a measuring device or field device 3. The measuring device 3 and the PC 1 are interconnected by an interface 2 so that they can exchange data. Furthermore, the PC 1 of the system 100 has a memory 7, on which program elements according to the invention, for example, are stored.

Figure 2:
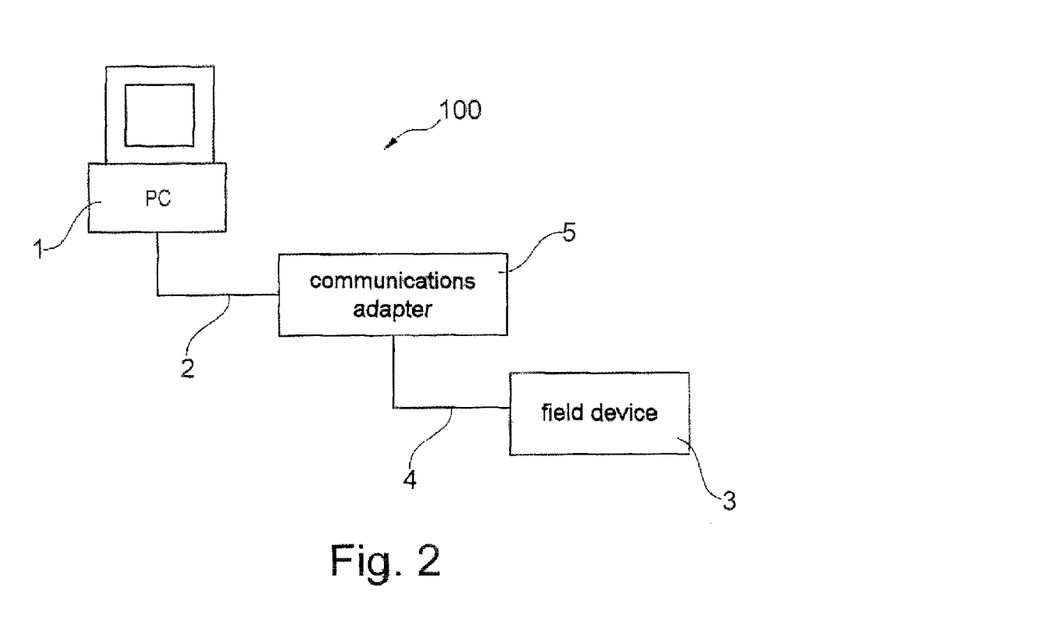
FIG. 2 shows a measuring system according to a further embodiment of the invention.

There can also be provided between the field device 3 and the PC 1 a communications adapter 5 to which the PC 1 is connected by the interface 2 and which, in turn, is connected to the field device 3 by the interface 4 (see FIG. 2).

In step 301 of FIG. 3A, establishing the connection between the PC 1 and the measuring device 3 is started. In step 302, an entire set of parameters is read out of the measuring device. Upon completion of "read device data", it is then possible to jump from one dialogue to another in the user interface of the arithmetic-logic unit, without a stagnant operation resulting due to the reloading of device parameters. This process can take place in user interfaces having an interface according to the FDT standard (for example PACTware with DTM).

However, depending on the type of device interface which is used, the loading procedure can take several minutes. In addition, after loading, a change counter can be computed in the operating software and can be written into the measuring device and also stored on the PC together with the set of device data. This means that it is possible for the operating software to only have to check the change counter when a connection is established at a later stage. If this change counter is consistent with the change counter in the measuring device, it is unnecessary to perform the step "read device data". In the case of some devices and operating programs, the device data record can be divided up into individual subgroups of parameters. For example, an individual change counter can be used to monitor changes for each group of parameters.

Thereafter, in step 303, the change counters are set such that they are identical in the PC and in the measuring device.

In step 304, if parameters are changed in the user interface, then although it is just only the changed parameters which are written into the device for the step "write into the device" (step 305), for safety reasons, immediately after writing, all the device parameters relevant to the user interface have to be fully read out again from the device (i.e. loaded into the PC), see step 306. This is necessary, since when individual parameters are written into the measuring device, further dependent parameters of which the user interface has no knowledge are possibly changed in the measuring device. Here as well, the loading procedure can last for several minutes.

Thereupon, in step 307, the change counters in the PC and in the measuring device can again be set such that they are identical.

In the case of other user interfaces which operate, for example, according to the EDD standard (for example PDM by Siemens or AMS by Emerson), for example only those device parameters can be loaded which are required for the currently opened dialogue in the operating program, executed on the user interface of the PC.

For the display of measured values and items of diagnostic information, the systems cyclically retrieve all the values which are to be displayed. To reduce the volume of data, switches can be provided which can control the interval time for the retrieval cycle.

Figure 4:
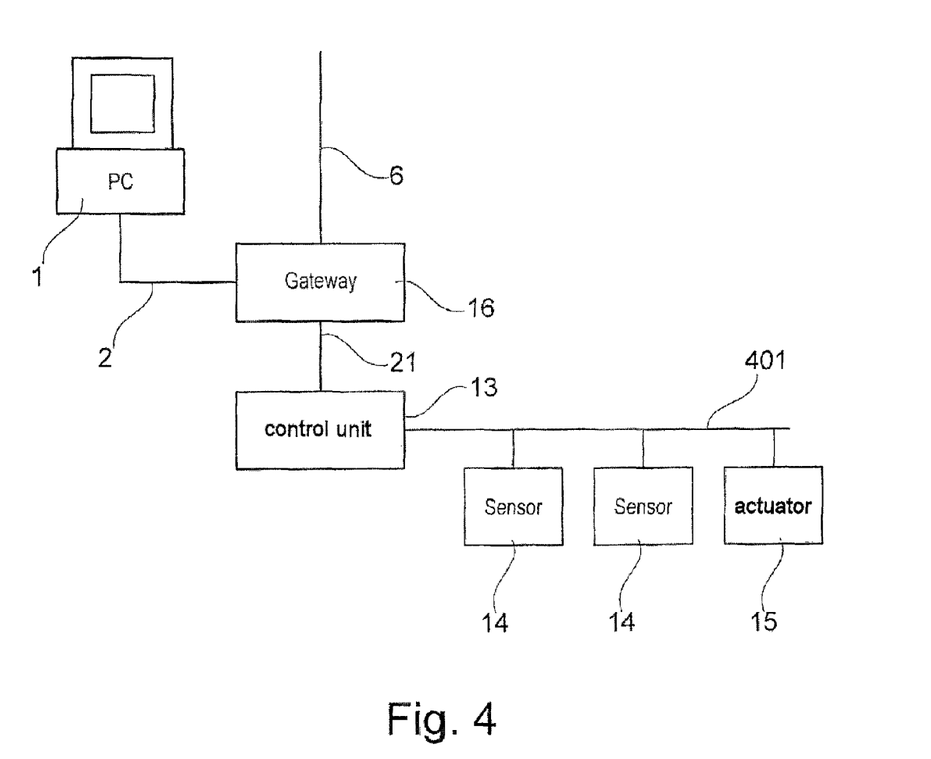
FIG. 4 shows a measuring system according to an embodiment of the invention.

FIG. 4 shows a further embodiment of a measuring system in which the PC 1 is connected via the interface 2 to a gateway 16 which is connected, for example, to a control unit 13 via the interfaces 6, 21. The control unit 13 is connected to a bus connection 401 to which the sensors 14 and the actuator 15 are also connected.

Specifically changing device parameters with the subsequent step "write into the measuring device" can be unnecessarily time consuming. Depending on the available network structure into which the measuring devices are integrated, several minutes of waiting time can be quickly required. For example, this can be the case if, as shown in FIG. 4, the PC 1 is connected to the field devices 14, 15 for operation via a gateway 16 and a control unit 13. Particularly if a bus connection of the HART or wireless HART type is then provided as bus connection 401.

However, also for Profibus, Foundation Fieldbus and other connections, the reaction times become inconveniently high where there are increasing numbers of field devices. The same applies to the complexity of the network structure. If communication has to take place over a plurality of network planes, the performance often suffers considerably as a result.

This problem can occur particularly in user interfaces which operate according to the FDT standard. In principle, other concepts, such as systems which operate according to the EDD standard, only load the parameters which are required in the respective dialogue of the user interface (UI). However, this has the disadvantage that in each exchange of dialogue, data have to be initially uploaded. For this as well, a waiting time of several seconds can quickly arise. Furthermore, it can often be difficult to obtain a consistent image of the entire device data on the PC, since portions are only ever loaded in each case.

In the case of the cyclic retrieval of measured values or of items of diagnostic information, the volume of data can indeed be reduced by increasing the interval times between the various exchanges of data. However, this also results in a delayed display of states which is possibly inadmissible in practice.

The arrangement and method according to the invention use a "flag" in the measuring devices. This flag informs the respective operating program whether the step "write into the measuring device" has influenced other parameters. If this is not the case, then it is possible to fully dispense with the read-back of parameters into the operating program (see FIG. 5). If it is assumed that only a small proportion of the device parameters has dependencies anyway, then in most cases, the changing of parameters will take place with maximum performance. In the case of systems which operate according to the FDT standard, consistent data are always obtained on the PC in this way without additional waiting times.

In the case of EDD-based systems as well, not all the parameters present on a dialogue would have to be written and reloaded. Here as well, it would suffice to write just the changed parameters, to check the flag and, as long as no dependency is indicated, to read back only the changed value into the PC.

Thus, the method for reducing the volume of data for measured value and diagnostics retrieval dynamically reduces the volume of data, depending on the actual degree of changes in the system. Therefore, in principle, the maximum reaction time is maintained.

Figure 5:
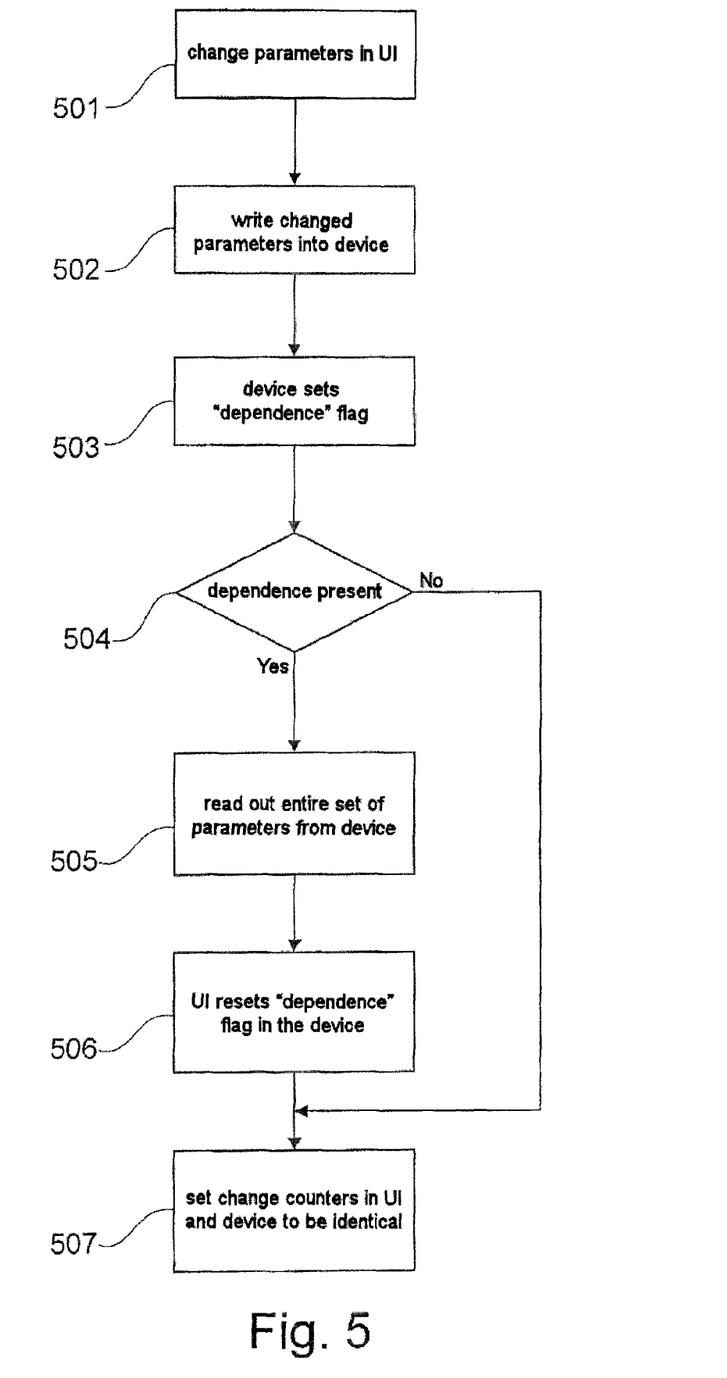
FIG. 5 shows a flow chart of a method for changing a set of parameters in a measuring device.

In step 501, parameters (device parameters) are changed in the user interface (control unit 1, 13). In step 502, the changed parameters are then written into the measuring device. In step 503, the measuring device sets the "dependence" flag at TRUE or FALSE, depending on the state and, in step 504, the flag is used in the measuring device to check whether a dependence of this type is present. If this is not the case, then step 507 follows in which the change counters in the user interface and in the measuring device are set such that they are identical. If dependencies are present, then step 505 follows in which the entire set of parameters is read out of the device. In step 506, the user interface resets the "dependence" flag in the measuring device, whereupon in step 507 the change counters in the user interface and in the measuring device are set such that they are identical.

In process automation, operating programs are used for the operation of controls, communications components and field devices which are usually connected to a computer (PC, laptop or the like) by a bus system. As already described above, these operating programs are usually FDT frame applications, FDI hosts or DD hosts. In particular, the FDT frame applications can not only be used for the most current standardised bus systems. They also allow the use at the configuration interfaces of devices when private protocols are communicated thereby.

Common to these systems is the fact that they cannot be used by themselves. Usability is only achieved by loading the respective device drivers for the devices which are to be operated. In the case of FDT, these drivers are the DTM, and in the case of DD hosts, they are the DD.

The device drivers receive the actual user interface for the respective devices and the communication mechanisms suitable for the devices are also in said drivers.

According thereto, measures are required on the devices and on the device drivers.

In the devices, for example a function is supplemented which then sets the "dependence" flag when a parameter is manipulated in the device, which parameter influences other parameters due to dependencies. This can be caused, for example, by changing an overall device unit of measurement or by changing the type of use. The flag remains set until an operating program resets it. In order to know whether parameters have dependencies on other parameters, the parameters applied in the device can receive in each case an appropriate identification, for example, which is then evaluated by the above-mentioned function.

After changed parameters have been written into the device, a check must be carried out in the device drivers whether the device indicates "dependencies". If this is not the case, then the procedure is at an end. Depending on the security philosophy, the written parameter can be read back once again. If dependencies are indicated, the change counter can check which groups of parameters have to be read back, or basically the entire set of parameters is read back. The "dependency" flag is then reset once again in the device. In the case of DTM, the change counters in the device are then typically also brought into agreement with one another again. The entire data record in the DTM and in the device is thereby consistent again and is also characterised as such. An advantage of this procedure is that the operating program does not have to have any knowledge about the dependencies of the parameters. These are serviced at a central location and, even in the event of changes, are thus always handled currently in the operating program by software updates, without the operating program having to be updated.

The device drivers typically also provide dialogues and windows to display measured values and items of diagnostic information. These are generally retrieved cyclically so that values which are always current are displayed in the dialogue or display window. In devices which are presently becoming ever more complex, the amount of different items of measured value information and items diagnostic information gives rise to a considerable amount of communication which can result in significant problems due to a restricted bandwidth on the bus systems.

In other words, for these types of information as well, the introduction of a change feature is very advantageous, because as a result it would be sufficient to request the change status per cycle and, only when the content had actually been changed, it would be sufficient to also actually read out the entire measured values and diagnoses.

Figure 6:
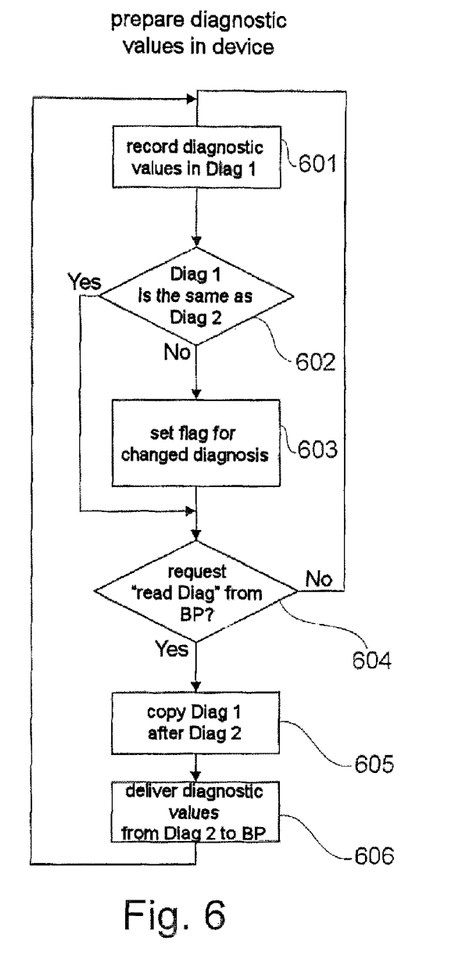
FIG. 6 shows a flow chart of a method for providing diagnostic values.

FIG. 6 shows by way of example a method for field devices, according to which said devices cyclically provide their diagnostic values in a buffer "Diag 1" and set the "changed diagnostic values" flag if changed values are recorded. Only if specifically the read request of the diagnostic values by the operating program arrives are the data copied into the buffer "Diag 2" and the content of Diag 2 is delivered to the operating program.

In other words, in step 601, the diagnostic values are recorded in Diag 1 and, in step 602, it is established whether Diag 1 is the same as Diag 2. If this is not the case, step 603 will follow in which the flag is set for a changed diagnosis. However, if it is established in step 602 that Diag 1 is the same as Diag 2, step 604 will immediately follow (setting the flag for a changed diagnosis, therefore step 606 is omitted). In step 604, it is established whether the operating device has sent the request "read diag" to the measuring device. If this is not the case, the procedure continues with step 601. If this is the case, which is very likely, then step 605 will follow, in which Diag 1 is copied after Diag 2. Thereafter follows step 606 in which the diagnostic values from Diag 2 are delivered to the operating device. The process then starts anew with step 601.

Figure 7:
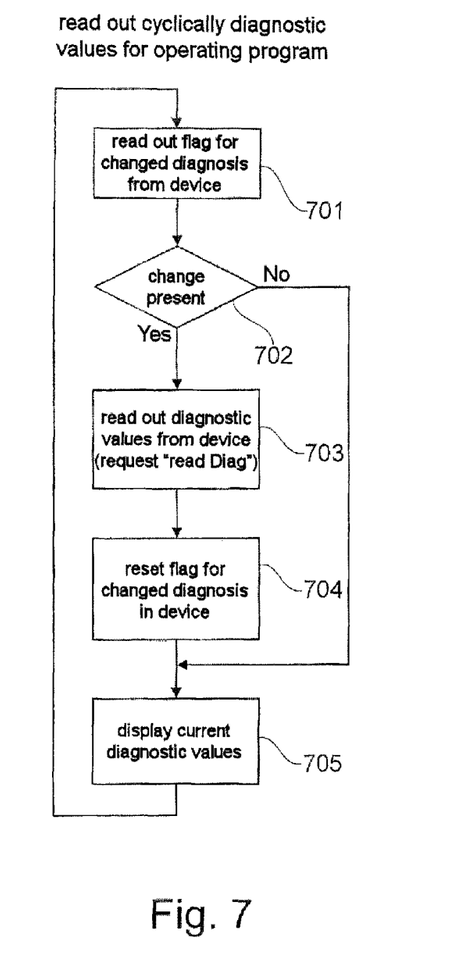
FIG. 7 shows a flow chart of a method for cyclically reading out diagnostic values for operating programs.

FIG. 7 shows a sequence for the operating program. The operating program cyclically reads out the flag for changed diagnoses in the measuring device (step 701). As long as the flag is not set (this is checked in step 702), no further data are retrieved for diagnosis and the display in the diagnostic window of the operating program remains unchanged (step 705). Only if the flag indicates changes are the diagnostic values read out of the measuring device (request "read Diag") in step 703 and, in step 704, the flag for a changed diagnosis is reset in the measuring device. Then, in step 705, the current diagnostic values are displayed.

Figure 8:
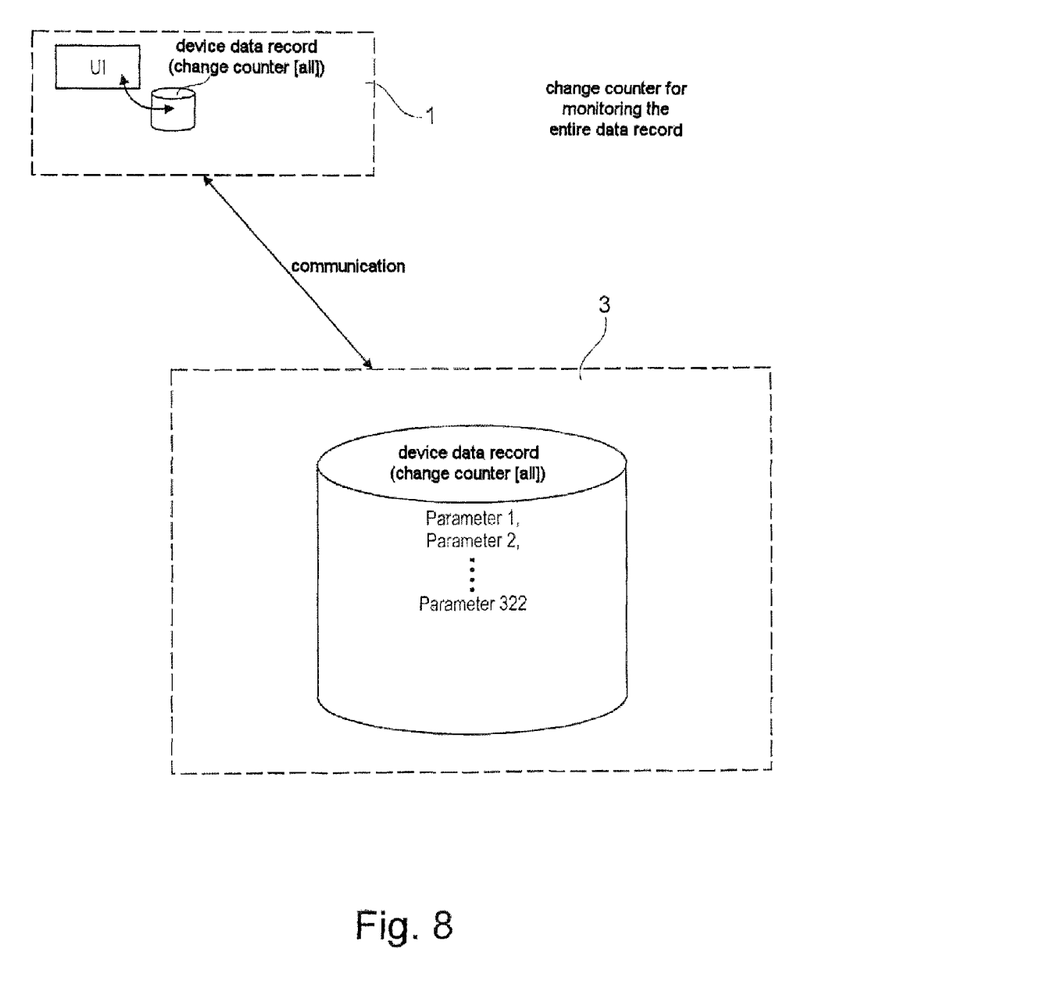
FIG. 8 shows an example of a change counter for monitoring entire data records.

FIG. 8 shows the communication between an operating tool or a control unit 1 and a field device 3. The change counter present in the field device is used to monitor the entire data record stored in the field device. If this counter indicates a change, then the entire data record is loaded into the control unit 1.

Figure 9:
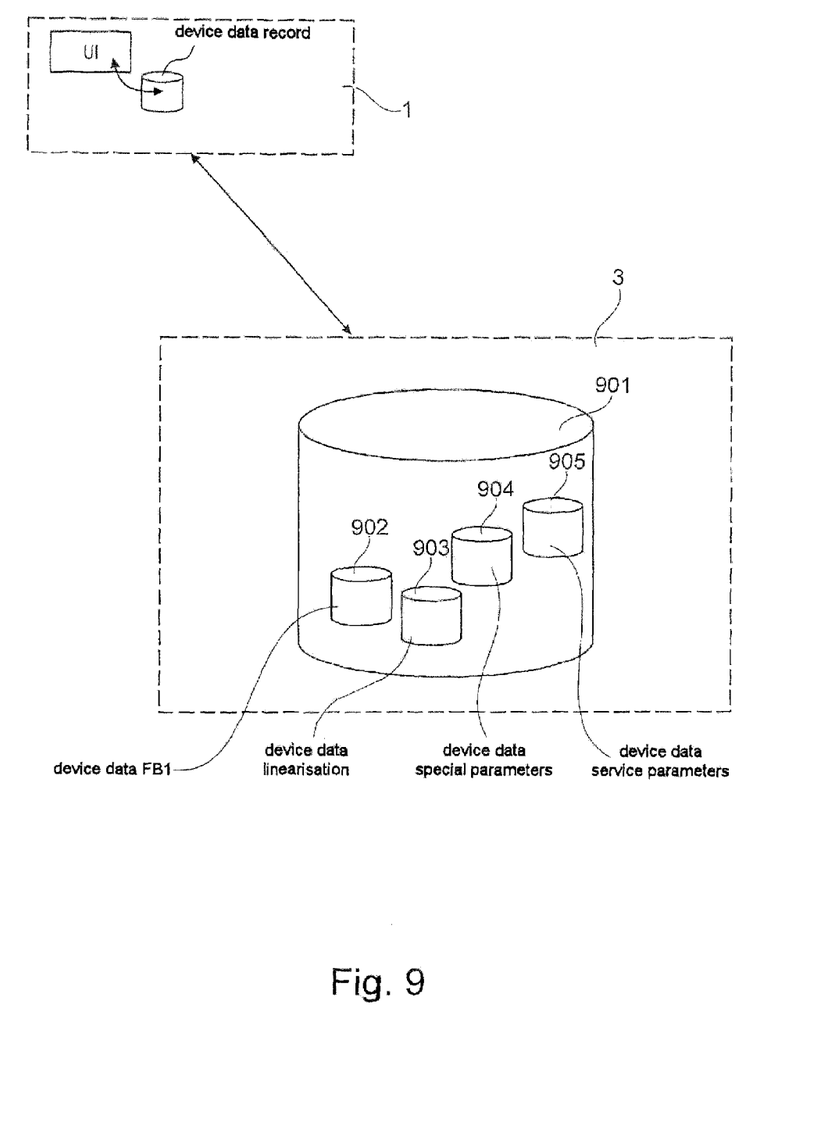
FIG. 9 shows an example of change counters for monitoring individual groups of parameters.

As can be seen from FIG. 9, it is also possible for groups of parameters to be formed in the field device 3 which, taken together, form the device data record 901. These groups of parameters are, for example, the device data FB1 902 including parameters 1-20, the device data linearisation 903 including parameters 21-66, the device data special parameters 904 including parameters 67-143, and the device data service parameters 905 including parameters 144-214.

Each group of parameters 902 to 905 has its own counter or flag which, for example, is pre-initialised with the value 1 and may be used to monitor the individual groups of parameters. For example, the device data FB1 may have a change counter [FB1], the device data linearisation 903 may have a change counter [LIN], the device data special parameters 904 may have a change counter [SP], and the device data service parameters 905 may have a change counter [SRV]. If a parameter in one of the groups is changed, the corresponding change counter (flag) is raised. The operating device 1 and the device data record 901 may communicate with each other so that, at a specific time, the change counter or all the change counters (of which there are four in the example of FIG. 9) are loaded into the operating device 1 and the operating device then decides which group of parameters is to be uploaded into the operating device by the field device. The counter indications of the change counters are stored in the operating device and compared with the recently uploaded counter indications. In this manner, it can be established in the operating device whether or not something has changed in a group of parameters.

However, not every parameter change automatically also results in a change of other parameters in the field device. A list of the dependent parameters 1001 can be stored in the field device, which list has the parameters 7, 29, 78 and 119 in the example of FIG. 10.

Figure 10:
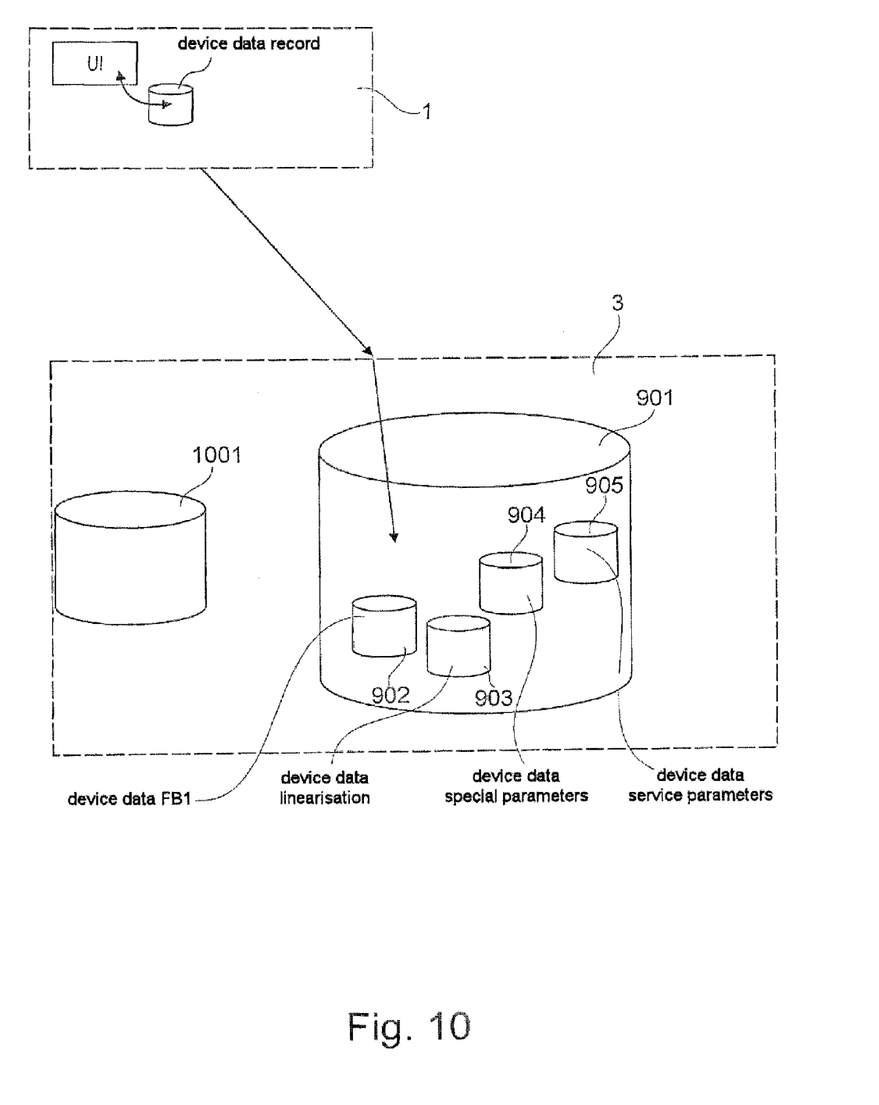
FIG. 10 shows the use of a flag for indicating that a written parameter has dependencies.

Using this list, the field device can check (using, e.g., the dependence flag to indicate whether a written parameter has dependencies) whether other parameters have changed or are being changed because another parameter has changed. If this is the case, the corresponding change counter of the group of parameters can be changed.

Thereupon, all four change counters are uploaded into the operating device 1 and compared therein with the previous change counter. The operating device can then establish whether one of the change counters has changed. If this is the case, the corresponding group of parameters can be requested by the operating device 1 and uploaded.

In addition, it is pointed out that the terms "comprising" and "having" do not exclude any other elements or steps and "an" or "a" do not exclude a plurality. It is also pointed out that features or steps which have been described with reference to one of the above embodiments can also be used combined with other features or steps of other embodiments described above. Reference signs in the claims should not be construed as limiting the scope of the claims.

The invention claimed is:

1. A level measuring system, comprising:
a level measuring device; and
a control unit connected to the level measuring device via a communication interface;
wherein the level measuring device is configured to determine one of (a) whether a current measured value, recorded by the level measuring device in a measurement, differs from a measured value recorded in the measurement preceding this measurement; (b) whether a current item of diagnostic information, generated by the level measuring device, differs from an item of diagnostic information preceding this item of diagnostic information; and (c) whether a current device parameter has changed due to another device parameter changing;
wherein the control unit is configured to retrieve one of (a) the current measured value, (b) the current item of diagnostic information and (c) the current device parameter from the level measuring device only when the level measuring device has established one of (A) a difference between one of (1) the measured values and (2) the items of diagnostic information and (B) the device parameter has changed;
wherein upon determining that one of the current measured value, the current item of diagnostic information and the current device parameter has changed, the level measuring device records this fact in a flag; and
wherein the control unit retrieves the flag and, after checking the flag, decides whether or not one of the current measured value, the current item of diagnostic information and the current device parameter is to be retrieved from the level measuring device.

2. The level measuring system according to claim 1, wherein the control unit transmits the other device parameter to the level measuring device before the level measuring device makes the determination.

3. The level measuring system according to claim 1, wherein the determination whether the current device parameter has changed due to another device parameter changing is made by identifying the other device parameter in a list provided for this purpose.

4. The level measuring system according to claim 1, wherein the level measuring device only makes the determination if one of (a) a new measured value has been recorded, (b) a new item of diagnostic information has been generated and (c) the control unit has triggered the changing of a device parameter by writing the device parameter into a memory of the level measuring device.

5. The level measuring system according to claim 1, wherein the control unit retrieves an entire set of device parameters from the level measuring device when the level measuring device has established that the current device parameter has changed.

6. The level measuring system according to claim 1, wherein the control unit checks whether the level measuring device has made the determination.

7. The level measuring system according to claim 1, wherein the level measuring device automatically informs the control unit when it has made the determination.

* * * * *